United States Patent
Chung

(10) Patent No.: US 12,020,459 B2
(45) Date of Patent: Jun. 25, 2024

(54) SYSTEMS AND METHODS FOR DETERMINING DOMINANT COLORS IN AN IMAGE

(71) Applicant: Behr Process Corporation, Santa Ana, CA (US)

(72) Inventor: Un Ho Chung, Santa Ana, CA (US)

(73) Assignee: Behr Process Corporation, Santa Ana, CA (US)

( * ) Notice: Subject to any disclaimer, the term of this patent is extended or adjusted under 35 U.S.C. 154(b) by 0 days.

(21) Appl. No.: 18/205,872

(22) Filed: Jun. 5, 2023

(65) Prior Publication Data
US 2023/0316576 A1    Oct. 5, 2023

Related U.S. Application Data

(63) Continuation of application No. 17/470,328, filed on Sep. 9, 2021, now Pat. No. 11,670,006, which is a (Continued)

(51) Int. Cl.
*G06T 7/90* (2017.01)
*G06V 10/26* (2022.01)
*G06V 10/56* (2022.01)

(52) U.S. Cl.
CPC .............. *G06T 7/90* (2017.01); *G06V 10/267* (2022.01); *G06V 10/56* (2022.01); *G06T 2207/10024* (2013.01)

(58) Field of Classification Search
CPC ............ G06T 7/90; G06T 2207/10024; G06V 10/267; G06V 10/56
See application file for complete search history.

(56) References Cited

U.S. PATENT DOCUMENTS

| 6,757,428 B1 | 6/2004 | Lin et al. |
| 6,963,425 B1 | 11/2005 | Nair et al. |

(Continued)

FOREIGN PATENT DOCUMENTS

| JP | 2003189186 A | 7/2003 |
| JP | 2006350546 A | 12/2006 |

(Continued)

OTHER PUBLICATIONS

Office Action regarding Chilean Patent Application No. 201801574, dated Jun. 28, 2019. Translation provided by Clarke Modet & Co.

(Continued)

*Primary Examiner* — Qian Yang
(74) *Attorney, Agent, or Firm* — Harness, Dickey & Pierce, P.L.C.

(57) ABSTRACT

Systems and methods for determining a dominant color in a digital image are provided and include dividing a digital image into a first and second set of pixels and selecting pixels from the first and second sets based on first and second sample rates, respectively, the first set of pixels being closer to the center of the image than the second set and the first sample rate being greater than the second sample rate. A chroma and/or lightness filter is applied to the selected pixels. The remaining pixels after filtering are grouped based on hue, chroma, and lightness. A dominant color for the digital image is determined based on a color associated with the that has the greatest number of pixels.

18 Claims, 3 Drawing Sheets

Related U.S. Application Data continuation of application No. 16/778,564, filed on Jan. 31, 2020, now Pat. No. 11,120,580, which is a continuation of application No. 15/996,668, filed on Jun. 4, 2018, now Pat. No. 10,552,985.

(60) Provisional application No. 62/519,615, filed on Jun. 14, 2017.

(56) References Cited

U.S. PATENT DOCUMENTS

| | | |
|---|---|---|
| 8,086,031 B2 | 12/2011 | Chen et al. |
| 8,908,986 B1 | 12/2014 | Roy |
| 2003/0083850 A1 | 5/2003 | Schmidt et al. |
| 2004/0130546 A1 | 7/2004 | Porikli |
| 2008/0232686 A1 | 9/2008 | Ohashi |
| 2012/0201450 A1 | 8/2012 | Bryant et al. |
| 2012/0288195 A1 | 11/2012 | Lings et al. |
| 2014/0037200 A1 | 2/2014 | Phillips et al. |
| 2017/0076142 A1 | 3/2017 | Chang |
| 2017/0228895 A1 | 8/2017 | Lee et al. |
| 2018/0301113 A1 | 10/2018 | Clawges et al. |
| 2019/0138168 A1 | 5/2019 | Vickers et al. |
| 2019/0164293 A1 | 5/2019 | Ellison |

FOREIGN PATENT DOCUMENTS

| | | |
|---|---|---|
| JP | 2008234124 A | 10/2008 |
| KR | 20050053623 A | 6/2005 |
| WO | WO-2004018984 A1 | 3/2004 |

OTHER PUBLICATIONS

Krishnan et al. "Content Based Image Retrieval using Dominant Color Identification Based on Foreground Objects", International Conference on Computational Intelligence and Multimedia Applications 2007 (Year: 2007).

Ekin et al. "Shot Type Classification by Dominant Color for Sports Video Segmentation and Summarization", ICASSP 2003 (Year: 2003).

Chang et al., "Color Filter Array Recovery Using a Threshold-based Variable Number of Gradients", Proc. SPIE 3650, Sensors, Cameras, and Applications for Digital Photography, (Mar. 22, 1999) (Year: 1999).

Mojsilovic' et al., "Extraction of Perceptually Important Colors and Similarity Measurement for Image Matching, Retrieval, and Analysis", IEEE Transactions On Image Processing, vol. 11, No. 11, Nov. 2002 (Year: 2002).

Office Action regarding Korean Patent Application No. 10-2018-0068249, dated Sep. 5, 2023. Translation provided by S.Y. Cha.

SYSTEMS AND METHODS FOR DETERMINING DOMINANT COLORS IN AN IMAGE

CROSS-REFERENCE TO RELATED APPLICATIONS

This application is a continuation of U.S. application Ser. No. 17/470,328, filed Sep. 9, 2021, which is a continuation of U.S. application Ser. No. 16/778,564, filed Jan. 31, 2020, now U.S. Pat. No. 11,120,580, which is a continuation of U.S. application Ser. No. 15/996,668, filed Jun. 4, 2018, now U.S. Pat. No. 10,552,985, which claims the benefit of U.S. Provisional Application No. 62/519,615, filed on Jun. 14, 2017. The entire disclosures of the above applications are incorporated herein by reference.

FIELD

The present disclosure relates to systems and methods for determining dominant colors in a digital image and, more particularly, to systems and methods for determining dominant colors in a digital image that mimic human perception of the image.

BACKGROUND

This section provides background information related to the present disclosure, which is not necessarily prior art.

In processing and analysis of digital images, it is useful to determine one or more dominant colors that appear in the digital image. For example, a digital image can be analyzed to determine a dominant color, which is then matched to a paint color and used by a consumer to purchase paint matching the dominant color in the digital image.

Existing systems use mathematical algorithms to average the color values across all pixels in an image. For example, the hue, chroma, and lightness/darkness values can be averaged to provide a color representative of the entire image. Such methods, however, can generate low chroma colors and/or emphasize background colors that differ from the human perception of the image.

SUMMARY

This section provides a general summary of the disclosure, and is not a comprehensive disclosure of its full scope or all of its features.

The present disclosure provides a system comprising a computing device configured to receive a digital image, divide the digital image into pixel groups including at least a first pixel group and a second pixel group, analyze pixels in the first pixel group based on a first sample rate, analyze pixels in the second pixel group based on a second sample rate, and determine a dominant color for the digital image based on the analyzed pixels in the first pixel group and analyzed pixels in the second pixel group, with the pixels in the first pixel group being closer to the center of the image than the pixels in the second pixel group and the first sample rate being greater than the second sample rate.

In some configurations, the groups also include a third pixel group and the computing device is further configured to analyze pixels in the third pixel group based on a third sample rate and determine the dominant color for the digital image based on the analyzed pixels in the third pixel group, in addition to the analyzed pixels in the first pixel group and the analyzed pixels in the second pixel group, with the pixels in third pixel group being farther from the center of the image than the pixels in the first pixel group and the pixels in the second pixel group, and with the third sample rate being less than the second sample rate.

In some configurations, the computing device is further configured to generate a tally for each pixel color of the analyzed pixels in the first pixel group and the analyzed pixels in the second pixel group and determine the dominant color for the digital image based on the pixel color having a greatest corresponding tally.

In some configurations, the computing device is further configured to determine chroma values for the pixels in the first pixel group and the pixels in the second pixel group and to exclude from the analysis any pixel having a chroma value that is less than a predetermined chroma threshold.

In some configurations, the computing device is further configured to determine lightness values for the pixels in the first pixel group and the pixels in the second pixel group and to exclude from the analysis any pixel having a lightness value that is less than a predetermined lightness threshold.

In some configurations, the computing device is further configured to determine lightness values for the pixels in the first pixel group and the pixels in the second pixel group and to exclude from the analysis any pixel having a lightness value that is greater than a predetermined lightness threshold.

In some configurations, the computing device is further configured to determine a closest matching paint color to the dominant color and output at least one of a paint color name and a paint color identification code for the closest matching paint color to the dominant color.

In another form, the present disclosure provides a method that includes receiving, with a computing device, a digital image. The method also includes dividing, with the computing device, the digital image into a plurality of pixel groups including at least a first pixel group and a second pixel group. The method also includes analyzing, with the computing device, pixels in the first pixel group based on a first sample rate. The method also includes analyzing, with the computing device, pixels in the second pixel group based on a second sample rate. The method also includes determining, with the computing device, a dominant color for the digital image based on the analyzed pixels in the first pixel group and the analyzed pixels in the second pixel group. The pixels in the first pixel group are closer to the center of the image than pixels in the second pixel group and the first sample rate is greater than the second sample rate.

In some configurations, the plurality of pixel groups also includes a third pixel group having pixels that are farther from the center of the image than the pixels in the first pixel group and the pixels in the second pixel group and the method further includes analyzing, with the computing device, pixels in the third pixel group based on a third sample rate, the third sample rate being less than the second sample rate and determining, with the computing device, the dominant color for the digital image based on the analyzed pixels in the third pixel group, in addition to the analyzed pixels in the first pixel group and the analyzed pixels in the second pixel group.

In some configurations, the method includes generating, with the computing device, a tally for each pixel color of the analyzed pixels in the first pixel group and the analyzed pixels in the second pixel group and determining, with the computing device, the dominant color for the digital image based on the pixel color having a greatest corresponding tally.

In some configurations, the method includes determining, with the computing device, chroma values for the pixels in the first pixel group and the pixels in the second pixel group and excluding, with the computing device, from the analysis any pixel having a chroma value that is less than a predetermined chroma threshold.

In some configurations, the method includes determining, with the computing device, lightness values for the pixels in the first pixel group and the pixels in the second pixel group and excluding, with the computing device, from the analysis any pixel having a lightness value that is less than a predetermined lightness threshold.

In some configurations, the method includes determining, with the computing device, lightness values for the pixels in the first pixel group and the pixels in the second pixel group and excluding, with the computing device, from the analysis any pixel having a lightness value that is greater than a predetermined lightness threshold.

In some configurations, the method includes determining, with the computing device, a closest matching paint color to the dominant color and outputting, with the computing device, at least one of a paint color name and a paint color identification code for the closest matching paint color to the dominant color.

In another form, the present disclosure provides a non-transitory computer readable medium storing an application for a computing device. The application includes computer executable instructions to configure the computing device to receive a digital image, divide the digital image into a plurality of pixel groups including at least a first pixel group and a second pixel group, analyze pixels in the first pixel group based on a first sample rate, analyze pixels in the second pixel group based on a second sample rate, and determine a dominant color for the digital image based on the analyzed pixels in the first pixel group and the analyzed pixels in the second pixel group, with the pixels in the first pixel group being closer to the center of the image than the pixels in the second pixel group and the first sample rate being greater than the second sample rate.

In some configurations, the application further includes computer executable instructions to further configure the computing device to generate a tally for each pixel color of the analyzed pixels in the first pixel group and the analyzed pixels in the second pixel group and determine the dominant color for the digital image based on the pixel color having a greatest corresponding tally.

In some configurations, the application further includes computer executable instructions to further configure the computing device to determine chroma values for the pixels in the first pixel group and the pixels in the second pixel group and to exclude from the analysis any pixel having a chroma value that is less than a predetermined chroma threshold.

In some configurations, the application further includes computer executable instructions to further configure the computing device to determine lightness values for the pixels in the first pixel group and the pixels in the second pixel group and to exclude from the analysis any pixel having a lightness value that is less than a predetermined lightness threshold.

In some configurations, the application further includes computer executable instructions to further configure the computing device to determine lightness values for the pixels in the first pixel group and the pixels in the second pixel group and to exclude from the analysis any pixel having a lightness value that is greater than a predetermined lightness threshold.

In some configurations, the application further includes computer executable instructions to further configure the computing device to determine a closest matching paint color to the dominant color and output at least one of a paint color name and a paint color identification code for the closest matching paint color to the dominant color.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
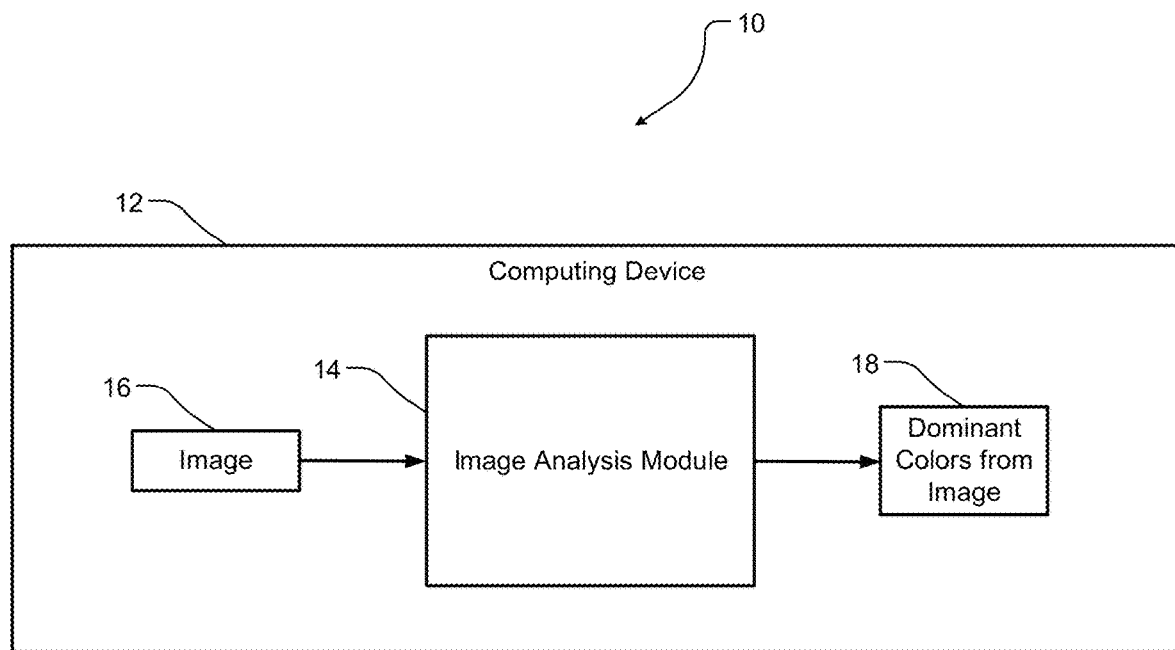
FIG. 1 is a block diagram of an image analysis system according to the present disclosure.

The present disclosure provides systems and methods for determining dominant colors in an image. With reference to FIG. 1, a system 10 for determining dominant colors in an image is shown. The system 10 can include a computing device 1302. The computing device can be a personal computer, a laptop, a mobile device, a table, or another suitable computing device with a processor and memory for carrying out the functionality described herein. The computing device includes an image analysis module 14. The image analysis module 14, for example, can be implemented as part of a mobile application for a mobile device 14, as part of a web application that runs in a browser of the computing device 12, or as a standalone application that runs on the computing device 12.

The image analysis module 14 receives a digital image 16 as input. The image analysis module 14 analyzes the received image and generates output 18 indicating one or more dominant colors from the image 18.

In particular, the image analysis module 14 analyzes individual pixels within an image file, starting at the center of the image and working outward from the center in a spiral fashion. As the image analysis module 14 gets further from the center of the image, the sampling rate is decreased such that pixels towards the center of the image are sampled at a higher rate than pixels towards the edge of the image. In this way, the pixels near the center are weighted more heavily than pixels away from the center and towards the edge of the image. In addition, low level chroma colors, such as pixels with colors that are below a predetermined chroma value threshold, i.e., very dull or muted colors, are excluded. In addition, low lightness colors, such as pixels with a lightness level below a brightness threshold, i.e., very dark colors, are also excluded. Further, high lightness colors, such as pixels with a lightness level above a brightness threshold, i.e., very bright colors, are also excluded. All remaining sampled colors are counted, with similar colors being grouped together. The image analysis module 14 then determines the color, or group of similar colors, with the highest count and returns that color, or a representative of the group of similar colors, as the dominant color for the image.

Figure 2:
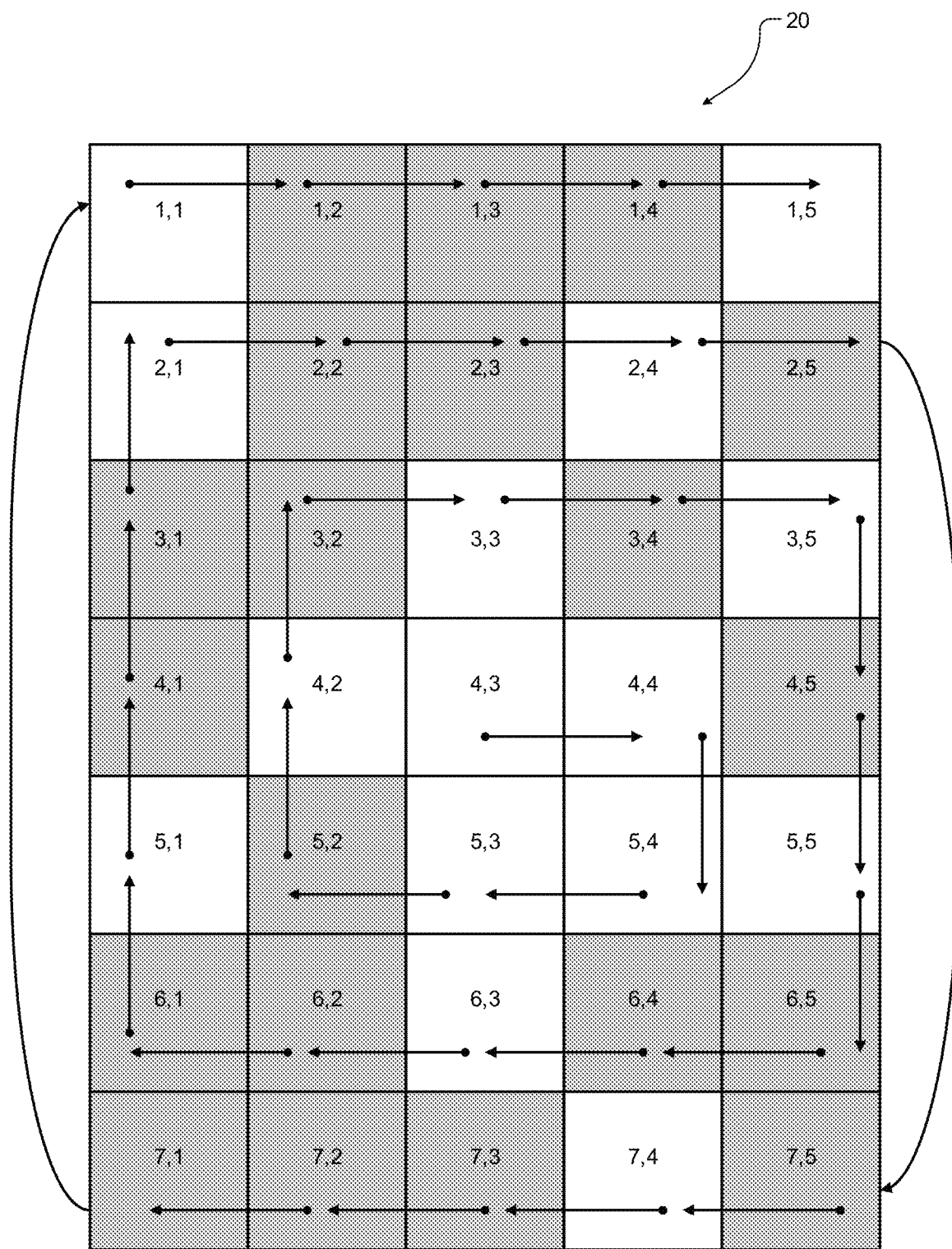
FIG. 2 is a diagram showing an analysis of pixels of an image by an image analysis system according to the present disclosure.

With reference to FIG. 2, an example image 20 is shown broken up into individual pixel squares, labelled by column and row, in the format of: row, column. For example, the upper left pixel is labelled as row, column: 1,1. The upper right pixel is labeled as row, column: 1,5. The lower left pixel is labelled as row, column: 7,1. The lower right pixel is labelled as row, column 7,5. While an image having seven rows and five columns is used here as an example, actual digital images can have a much larger number of pixels.

In this example, the sequence of analysis is indicated by the arrows and starts in the center of the image at pixel 4,3. Pixels that are included in the analysis of the image are shown with a white square. Pixels that are skipped or excluded from the analysis are shown grayed out.

Starting from the center of the image 20, the image analysis module 14 includes the first four pixels (i.e., 4,3; 4,4; 5,4; and 5,3) in the analysis. Then, starting at pixel 5,2, the image analysis module 1304 begins to analyze every other pixel. In other words, after pixel 5,3, the next four pixels analyzed are pixels: 4,2; 3,3; 3,5; and 5,5. Then, starting at pixel 6,5, the image analysis module 14 begins to skip two pixels for every one pixel included in the analysis. For example, after pixel 5,5, the next five pixels analyzed are pixels: 6,3; 5,1; 2,1; 2,4; and 7,4. Then, starting at pixel 7,4, the image analysis module 14 begins to skip three pixels for every one pixel analyzed. As such, after 7,4, the next three pixels analyzed are pixels: 1,1 and 1,5.

In this way, the image analysis module 14 decreases the pixel sample rate by skipping more and more pixels as it moves away from the center of the image. With respect to the remaining non-skipped pixels, the image analysis module 14 applies the above described filters for low chroma values, low lightness values, and high lightness values. The remaining pixels are then analyzed with similar pixel colors being grouped together. Based on the number of colors or similar pixel color groups, the image analysis module then determines one or more dominant colors for the image 20.

Figure 3:
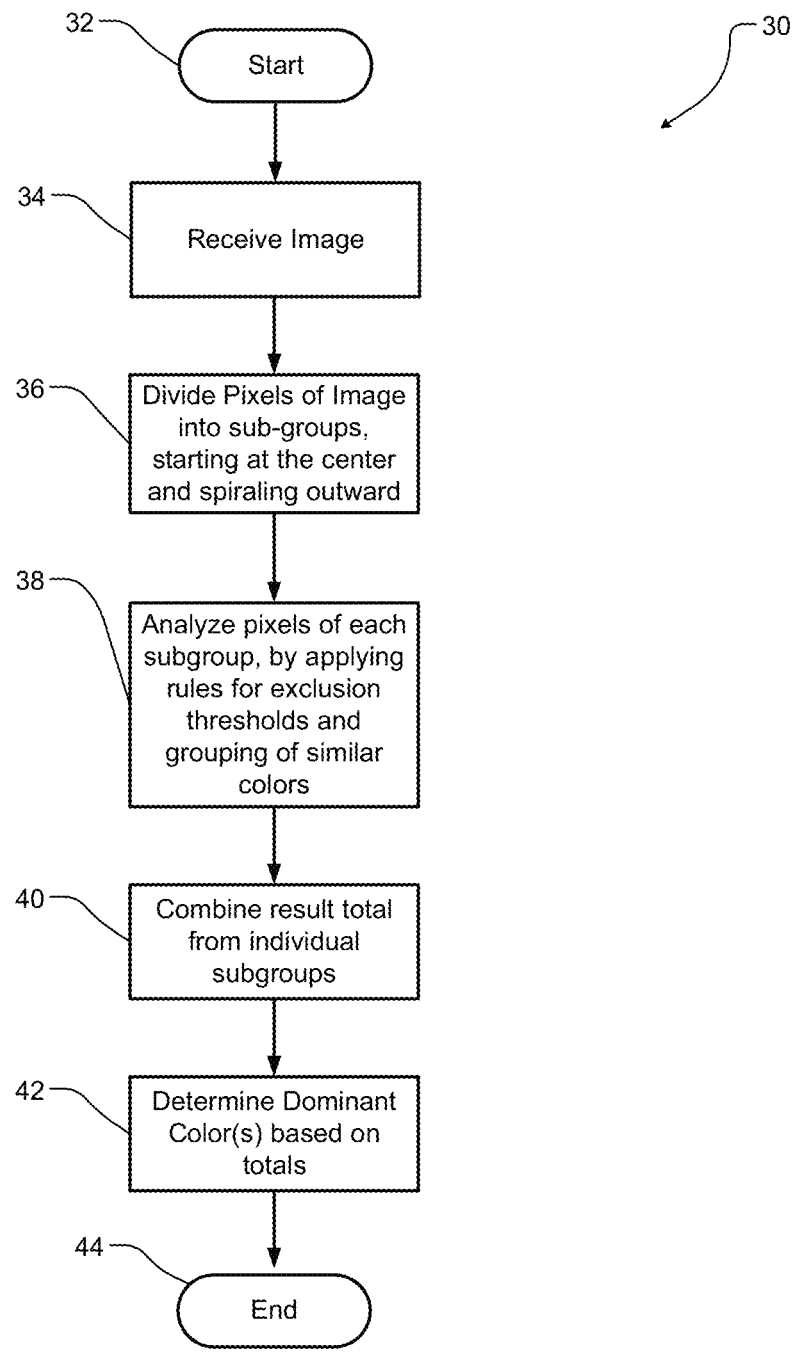
FIG. 3 is a flow chart for a method of analyzing images according to the present disclosure.

With reference to FIG. 3, a method 30 for analyzing images according to the present disclosure is shown. The method 30 can be executed by the image analysis module 14 of the computing device 12 and starts at 32. At 34, the image analysis module 14 receives the image 16. At 36, the image analysis module 14 divides the pixels of the image into subgroups, with each of the subgroups being analyzed with a different sampling rate. Using the example image of FIG. 2, the first subgroup would include pixels: 4,3; 4,4; 5,4; and 5,3. The second subgroup would include pixels: 5,2; 4,2; 3,2; 3,3; 3,4; 3,5; 4,5; and 5,5. The third subgroup would include pixels: 6,5; 6,4; 6,3; 6,2; 6,1; 5,1; 4,1; 3,1; 2,1; 2,2; 2,3; 2,4; 2,5; 7,5, and 7,4. The fourth subgroup would include pixels: 7,3; 7,2; 7,1; 1,1; 1,2; 1,3; 1,4; and 1,5.

At 38, the image analysis module 14 analyzes the different subgroups using different sample rates. For example, every pixel of the first subgroup is analyzed. Every other pixel of the second subgroup is analyzed. Every third pixel of the third subgroup is analyzed. Every fourth pixel of the fourth subgroup is analyzed. While four different sampling rates for four different subgroups are described with reference to FIGS. 2 and 3, any number of subgroups of pixels and any number of sampling rates can be used. Further, the image analysis module 14 can use different processing threads to perform the analysis of the various subgroups concurrently.

Also at 38, the individual pixels are analyzed based on the exclusionary rules discussed above. For example, any pixels with colors having a chroma value that is below a chroma threshold and are too dull or muted are excluded. Any pixels with colors having a lightness value that is below a lightness threshold and are too dark are excluded. Any pixels with colors having a lightness value that is above a lightness threshold and are too bright are excluded. In addition, similar colors, i.e., colors that have hue, chroma, and lightness/darkness values that are within a predetermined threshold of each other, are grouped together. For each subgroup, the totals for the different colors or groups of similar colors are tallied by the image analysis module 14.

At 40, the totals from the individual subgroups are combined such that the same colors or similar color groups are added together.

At 42, the image analysis module 14 then determines the dominant color or colors based on the totals. In other words, the color or color group with the highest total is deemed the dominant color for the image.

In some embodiments, the computing device 12 can then determine a closest matching paint color to the determined dominant color. For example, the computing device 12 may have access to a paint color database and may search the paint color database to find a closest matching paint color to the determined dominant color by comparing color values, such as, for example, RBG (red, green, blue) color values, CMYK (cyan, magenta, yellow and key/black) color values, and/or CIE XYZ color values, of the determined dominant color to color values of individual paint colors in the paint color database. Systems and methods for determining a closest matching paint color to a particular color are described, for example, in commonly assigned U.S. Pat. No. 9,928,543, titled Data-Driven Color Coordinator, issued on Mar. 27, 2018, which is incorporated herein in its entirety.

The method ends at 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terms computing device, and module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The servers, user devices, apparatuses, and methods described in this application may be partially or fully implemented with or by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A computing device configured to:
    divide a digital image into a plurality of pixel groups including at least a first set of pixels and a second set of pixels;
    select pixels from the first set of pixels based on a first sample rate;
    select pixels from the second set of pixels based on a second sample rate, the pixels in the first set of pixels being closer to the center of the image than the pixels in the second set of pixels and the first sample rate being greater than the second sample rate;
    apply at least one filter to the selected pixels from the first and second sets of pixels, the at least one filter including at least one of a chroma filter that removes pixels having a chroma value that is below a chroma threshold, a low lightness filter that removes pixels having a lightness value that is below a low lightness threshold, and a high lightness filter that removes pixels having the lightness value that is above a high lightness threshold;
    group pixels from the remaining pixels selected from the first and second sets pixels after applying the at least one filter into a plurality of groups such that pixels having hue, chroma, and lightness values that are within a predetermined threshold of each other are grouped together; and
    determine a dominant color for the digital image based on a color associated with a group from the plurality of groups that has a greatest number of pixels.

2. The computing device of claim 1, wherein the computing device is further configured to determine a closest matching paint color to the dominant color and output at least one of a paint color name and a paint color identification code for the closest matching paint color to the dominant color.

3. The computing device of claim 1, wherein the computing device is configured to select the pixels from the first set of pixels based on the first sample rate and to select pixels from the second set of pixels based on the second sample rate using different processing threads.

4. The computing device of claim 1, wherein the computing device is a mobile device having a mobile application that configures the computing device to divide the digital image into the plurality of pixel groups, select the pixels from the first set of pixels, select the pixels from the second set of pixels, apply the at least one filter, group the pixels from the remaining pixels, and determine the dominant color for the digital image.

5. The computing device of claim 1, wherein the computing device has a web application that runs in a browser of the computing device and that configures the computing device to divide the digital image into the plurality of pixel groups, select the pixels from the first set of pixels, select the pixels from the second set of pixels, apply the at least one filter, group the pixels from the remaining pixels, and determine the dominant color for the digital image.

6. The computing device of claim 1, wherein the computing device has an application that, when executed, configures the computing device to divide the digital image into the plurality of pixel groups, select the pixels from the first set of pixels, select the pixels from the second set of pixels, apply the at least one filter, group the pixels from the remaining pixels, and determine the dominant color for the digital image.

7. A method comprising:
    dividing, with a computing device, a digital image into a plurality of pixel groups including at least a first set of pixels and a second set of pixels;
    selecting, with the computing device, pixels from the first set of pixels based on a first sample rate;
    selecting, with the computing device, pixels from the second set of pixels based on a second sample rate, the pixels in the first set of pixels being closer to the center of the image than the pixels in the second set of pixels and the first sample rate being greater than the second sample rate;

applying, with the computing device, at least one filter to the selected pixels from the first and second sets of pixels, the at least one filter including at least one of a chroma filter that removes pixels having a chroma value that is below a chroma threshold, a low lightness filter that removes pixels having a lightness value that is below a low lightness threshold, and a high lightness filter that removes pixels having the lightness value that is above a high lightness threshold;

grouping, with the computing device, pixels from the remaining pixels selected from the first and second sets pixels after applying the at least one filter into a plurality of groups such that pixels having hue, chroma, and lightness values that are within a predetermined threshold of each other are grouped together; and determining, with the computing device, a dominant color for the digital image based on a color associated with a group from the plurality of groups that has a greatest number of pixels.

8. The method of claim 7, further comprising:
determining, with the computing device, a closest matching paint color to the dominant color; and
outputting, with the computing device, at least one of a paint color name and a paint color identification code for the closest matching paint color to the dominant color.

9. The method of claim 7, wherein selecting the pixels from the first set of pixels based on the first sample rate and selecting the pixels from the second set of pixels based on the second sample rate is performed using different processing threads of the computing device.

10. The method of claim 7, wherein the computing device is a mobile device having a mobile application that performs dividing the digital image into the plurality of pixel groups, selecting the pixels from the first set of pixels, selecting the pixels from the second set of pixels, applying the at least one filter, group the pixels from the remaining pixels, and determining the dominant color for the digital image.

11. The method of claim 7, wherein the computing device has a web application that runs in a browser of the computing device and that performs dividing the digital image into the plurality of pixel groups, selecting the pixels from the first set of pixels, selecting the pixels from the second set of pixels, applying the at least one filter, grouping the pixels from the remaining pixels, and determining the dominant color for the digital image.

12. The method of claim 7, wherein the computing device has an application that, when executed, configures the computing device to perform dividing the digital image into the plurality of pixel groups, selecting the pixels from the first set of pixels, selecting the pixels from the second set of pixels, applying the at least one filter, grouping the pixels from the remaining pixels, and determining the dominant color for the digital image.

13. A non-transitory computer readable medium storing an application for a computing device, the application including computer executable instructions to configure the computing device to:

divide a digital image into a plurality of pixel groups including at least a first set of pixels and a second set of pixels;

select pixels from the first set of pixels based on a first sample rate;

select pixels from the second set of pixels based on a second sample rate, the pixels in the first set of pixels being closer to the center of the image than the pixels in the second set of pixels and the first sample rate being greater than the second sample rate;

apply at least one filter to the selected pixels from the first and second sets of pixels, the at least one filter including at least one of a chroma filter that removes pixels having a chroma value that is below a chroma threshold, a low lightness filter that removes pixels having a lightness value that is below a low lightness threshold, and a high lightness filter that removes pixels having the lightness value that is above a high lightness threshold;

group pixels from the remaining pixels selected from the first and second sets pixels after applying the at least one filter into a plurality of groups such that pixels having hue, chroma, and lightness values that are within a predetermined threshold of each other are grouped together; and determine a dominant color for the digital image based on a color associated with a group from the plurality of groups that has a greatest number of pixels.

14. The non-transitory computer readable medium of claim 13, wherein the computer executable instructions further configure the computing device to determine a closest matching paint color to the dominant color and to output at least one of a paint color name and a paint color identification code for the closest matching paint color to the dominant color.

15. The non-transitory computer readable medium of claim 13, wherein the computer executable instructions further configure the computing device to select the pixels from the first set of pixels based on the first sample rate and to select pixels from the second set of pixels based on the second sample rate using different processing threads.

16. The non-transitory computer readable medium of claim 13, wherein the computing device is a mobile device and the computer executable instructions are included in a mobile application.

17. The non-transitory computer readable medium of claim 13, wherein the computing device and the computer executable instructions are included in a web application that runs in a browser of the computing device.

18. The non-transitory computer readable medium of claim 13, wherein the computing device and the computer executable instructions are included in an application that, when executed, configures the computing device to divide the digital image into the plurality of pixel groups, select the pixels from the first set of pixels, select the pixels from the second set of pixels, apply the at least one filter, group the pixels from the remaining pixels, and determine the dominant color for the digital image.

* * * * *